(12) United States Patent
Kwok et al.

(10) Patent No.: US 8,854,580 B2
(45) Date of Patent: Oct. 7, 2014

(54) METHOD OF PRODUCING SPATIALLY VARIABLE PRETILT ANGLES ACROSS A LIQUID CRYSTAL CELL

(75) Inventors: Hoi Sing Kwok, Hong Kong (CN); Yuet Wing Li, Hong Kong (CN); Man Chun Tseng, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 24 days.

(21) Appl. No.: 13/411,250

(22) Filed: Mar. 2, 2012

(65) Prior Publication Data

US 2012/0224127 A1 Sep. 6, 2012

Related U.S. Application Data

(63) Continuation of application No. PCT/CN2010/001330, filed on Sep. 1, 2010.

(60) Provisional application No. 61/272,217, filed on Sep. 2, 2009.

(51) Int. Cl.
*G02F 1/1337* (2006.01)
*G02F 1/141* (2006.01)
*G02F 1/29* (2006.01)

(52) U.S. Cl.
CPC ............. *G02F 1/133753* (2013.01); *G02F 2001/133761* (2013.01); *G02F 2001/294* (2013.01); *G02F 1/133788* (2013.01); *G02F 1/29* (2013.01); *G02F 1/133723* (2013.01)
USPC .......................................... 349/125; 349/134

(58) Field of Classification Search
CPC ................................................ G02F 1/133788

USPC .................................................... 349/134, 125
See application file for complete search history.

(56) References Cited

U.S. PATENT DOCUMENTS

| 5,889,566 | A | 3/1999 | Wu et al. |
| 6,124,914 | A | 9/2000 | Chaudhari et al. |
| 6,359,674 | B1 | 3/2002 | Horiuchi |
| 7,532,272 | B2 | 5/2009 | Woodgate et al. |
| 2002/0197415 | A1 | 12/2002 | Bravo Vasquez et al. |
| 2005/0109396 | A1 | 5/2005 | Zucchelli et al. |
| 2005/0237471 | A1* | 10/2005 | Kawamura .................. 349/158 |

FOREIGN PATENT DOCUMENTS

| CN | 1630735 A | 6/2005 |
| WO | 2005/101103 A1 | 10/2005 |

OTHER PUBLICATIONS

Honma et al., "Liquid-crystal variable-focus lenses with a spatially-distributed tilt angles," Optics Express, 17 (13): 10998-11006 (Jun. 22, 2009).
State Intellectual Property Office of the People's Republic of China, International Search Report in International Patent Application No. PCT/CN2010/001330 (Dec. 9, 2010).

(Continued)

*Primary Examiner* — Wen-Ying P Chen
(74) *Attorney, Agent, or Firm* — Leydig, Voit & Mayer, Ltd.

(57) ABSTRACT

A method of producing spatially varying pretilt angles across a liquid crystal cell coats a substrate with a polyimide alignment layer and a layer of photoalignment material on top of the polyimide layer. An applied beam with variable light dosage spatial or temporal profiles is then used to achieve a corresponding pretilt angle distribution.

14 Claims, 8 Drawing Sheets

(56) References Cited

OTHER PUBLICATIONS

Ye et al., "Liquid crystal lens prepared utilizing patterned molecular orientations on cell walls," Applied Phys. Lett., 89: 141112-1-14112-3 (2006).

Yeung et al., "Liquid crystal pretilt angle control using nanotextured surfaces," J. Appl. Phys, 99: 12456-01-12456-04 (2006).

Zhang et al., "Pretilt study of double-layer alignment film (DLAF)," Liquid Crystals, 35 (10): 1191-1197 (Oct. 2008).

* cited by examiner

METHOD OF PRODUCING SPATIALLY VARIABLE PRETILT ANGLES ACROSS A LIQUID CRYSTAL CELL

CROSS-REFERENCE TO RELATED APPLICATIONS

This patent application is a continuation of International Patent Application No. PCT/CN10/01330, filed Sep. 1, 2010, and claims the benefit of U.S. Provisional Patent Application No. 61/272,217, filed Sep. 2, 2009, which is incorporated by reference herein in its entirety.

FIELD OF THE INVENTION

The present invention relates generally to liquid crystal cells and relates more particularly to spatially varying a pretilt angle across a liquid crystal cell.

BACKGROUND OF THE INVENTION

Liquid crystals are useful as optical elements as their birefringence properties can be tuned electronically. Many applications of this technology, such as spherical and cylindrical lenses, require a variable retardation across the surface of the liquid crystal cell. One way of obtaining this variable retardation is to produce a spatially variable pretilt angle in a liquid crystal cell. The pretilt angle determines the alignment of the liquid crystal molecules in the bulk of the liquid crystal layer, which determines the retardation of the liquid crystal layer.

While it may be possible to create spatial variation of the pretilt angles by mechanically controlling the rubbing density of a polyimide alignment layer, doing so would be limited to producing one-dimensional variation and would only be practical for very small regions. While it is also possible to create spatial variation by combining a vertical alignment layer with a region of continuous horizontal alignment, creating the spatial variation in the boundary where the vertical alignment portion abuts the horizontal alignment portion, this would produce only a very limited region where spatial variation in pretilt angle is possible and would only be practicable for extremely small lenses.

BRIEF SUMMARY OF THE INVENTION

The described system and method can be applied to fabricate optical elements such as spherical and cylindrical lenses, beam steering devices and retardation plates that employ liquid crystal layers for electronic tunability of the birefringence and spatial variation of the retardation of the liquid crystal layer. The use of pretilt angles in liquid crystal cells can improve response times and reduce power consumption, and the use of spatially variable pretilt angles allows the use of a liquid crystal cell for certain applications without requiring a variable electric field or driving voltage.

In the present invention, a first layer of polyimide material with vertical (homeotropic) alignment properties is applied to a substrate. This polyimide is cured and is thus stable against further processing. A second layer of horizontal (homogenous) alignment material is coated on the first polyimide layer. Wherein the term "vertical" and the term "homeotropic" are synonymous and the term "horizontal" and the term "homogenous" are synonymous. This second layer is purposely made discontinuous and may be in the form of nano-domains or networks as shown in FIG. 2. The combination of these two layers will produce a pretilt angle that is between 0 and 90 degrees depending on the coverage of the first alignment layer by the second alignment layer. As the second layer approaches complete coverage of the first layer, a horizontal alignment with a pretilt angle approaching 0-5 degrees will be obtained in the liquid crystal layer. As the second layer approaches zero coverage of the first layer, a vertical alignment with a pretilt angle approaching nearly 90 degrees will be obtained.

Photoalignment material is used as the second layer in this bilayer alignment structure. This photoalignment material is a type of material that can be polymerized by linearly polarized light. The photo-polymer requires a certain dosage of light to completely polymerize. Light dosage is defined here as a function of both the light intensity and the exposure time. The light dosage can be varied either by varying the exposure time or the light intensity. If the photoalignment layer is exposed to a light dosage below a certain threshold, the photoalignment material remains unpolymerized and can be removed by solvents. Thus, the amount of photo-polymer that remains to form the second layer is a function of the light dosage.

As will be appreciated from the teachings herein, the light dosage is the mechanism by which the process controls the pretilt angle. Varying the light dosage varies the degree of coverage of the first layer by the second layer and the resulting area ratio of vertical to horizontal nano-domains, which in turn controls the formation of the pretilt angle. Thus, by adjusting the spatial pattern of the light dosage used in photoalignment through control of the light beam, a corresponding spatial variation of the pretilt angle can be achieved.

BRIEF DESCRIPTION OF THE SEVERAL VIEWS OF THE DRAWING(S)

DETAILED DESCRIPTION OF THE INVENTION

As noted above, an object of the present invention is to provide a system for producing spatially varying pretilt angles across a liquid crystal cell. The retardation $\delta$ of a liquid crystal layer of thickness d with nonuniform tilt angle and no twist deformation is given by $$\delta = \int_0^d \frac{\pi \Delta n(z)}{\lambda} dz$$

where $\lambda$ is the wavelength of light and $$\Delta n = n_e(\theta) - n_o$$

where $n_o$ and $n_e$ are the ordinary and extraordinary refractive indices of the liquid crystal molecules and $$\frac{1}{n_e^2(\theta)} = \frac{\sin^2\theta}{n_o^2} + \frac{\cos^2\theta}{n_e^2}.$$

For a liquid crystal layer with a nonuniform tilt angle, $$\theta=\theta(z).$$

Figure 1:
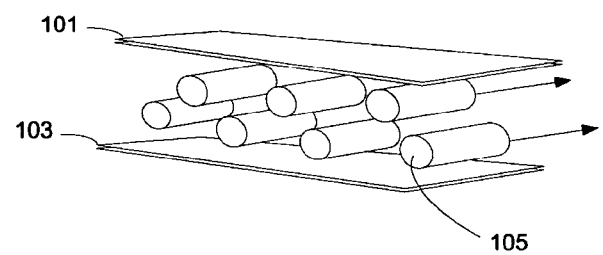
FIG. 1 is a schematic diagram illustrating an alignment of liquid crystal molecules within a liquid crystal cell.

The variation of the tilt angle of the liquid crystal molecules $\theta(z)$ is determined by the pretilt angles on the surfaces of the substrates (the boundary conditions) and elastic energy minimization as schematically shown in the simplified system 100 of FIG. 1, e.g., with reference to top and bottom surfaces 101 and 103, and aligned molecules 105. Elastic energy minimization is governed by the nonlinear Euler-Lagrange equations. This minimization is well known in the art, and commercial software is capable of solving these nonlinear equations. By using these equations to control the pretilt angle $\theta_o$, one can control the retardation $\delta$. Furthermore, if $\theta_o$ has a spatial variation across the liquid crystal cell, represented by $\theta_o(x,y)$, then $\delta$ will have a spatial variation $\delta(x,y)$ as well. This spatially variable $\delta(x,y)$ has many applications in fabricating electronically tunable optical elements.

In an embodiment of the invention, a substrate is first coated with a material that tends to produce a vertical alignment of the liquid crystal molecules. Such materials are commercially available, such as JALS2021, which is a polyimide produced by the JAPANESE SYNTHETIC RUBBER COMPANY. This first vertical alignment layer is thermally cured and then rubbed. The rubbing procedure provides the alignment direction which is same as the rubbing direction. The pretilt angle that would be produced by this first alignment layer alone is usually in the range of 85-89 degrees.

To form the second layer, photoalignable material that can be aligned with linearly polarized light is dissolved in a solvent and coated on top of the first layer through standard processes such as spin coating or screen printing. Upon drying, small domains can be formed depending on the type and concentration of the photoalignable material used. It is desired that that this second layer create a semi-uniform distribution of domain sizes of less than 1 micron, which assists the interaction between the vertical and horizontal domains to produce desirable pretilt angles. There are many photoalignable materials that can be used, such as the chemical ROP-103 from ROLIC COMPANY.

Figure 2:
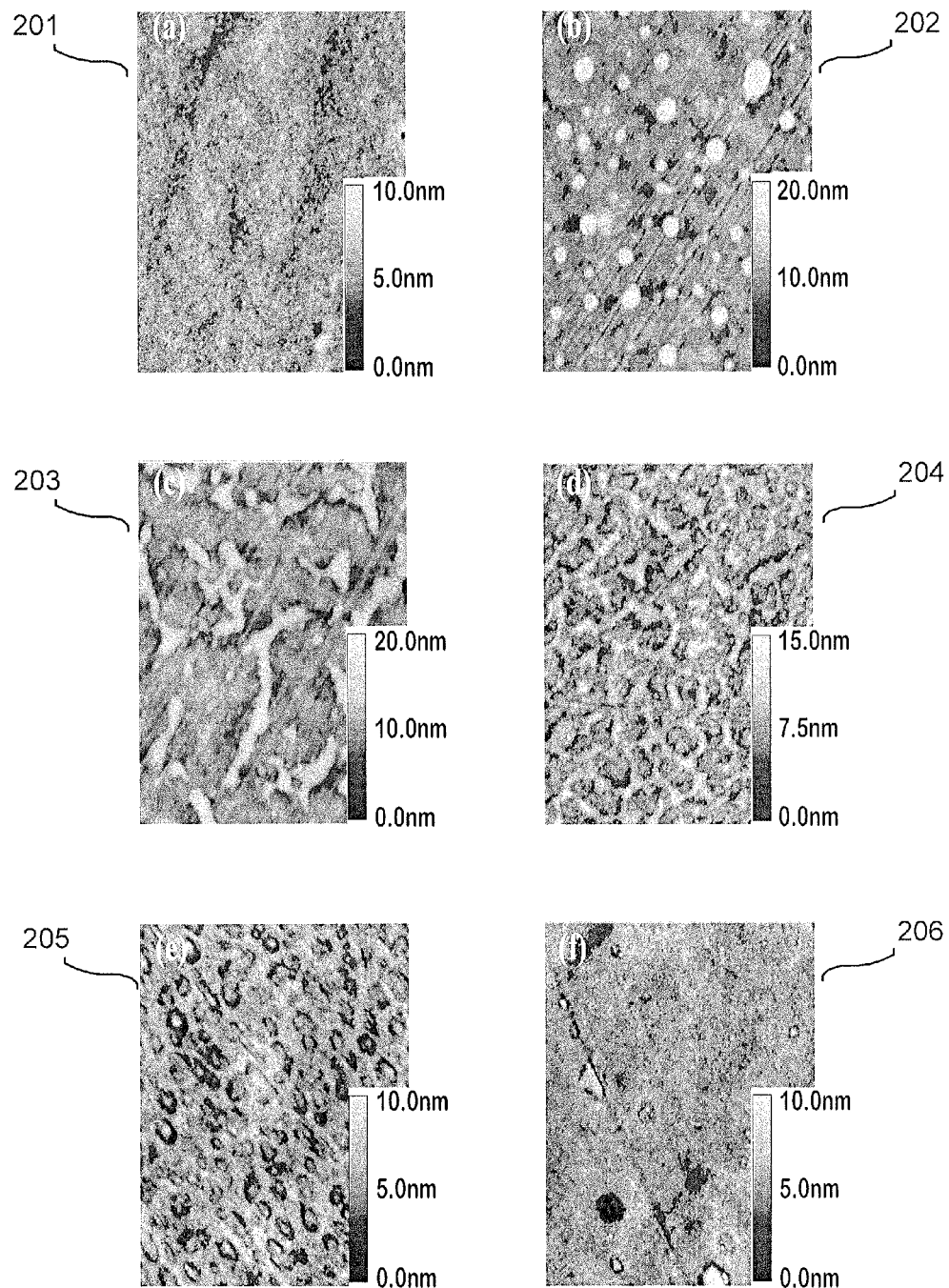
FIG. 2 is an exemplary AFM representation showing nano-domain structures with a discontinuous second layer of photoalignment material covering a continuous first layer of polymer.

Experiments have shown that at higher concentrations of ROP-103, complete coverage of the first layer by the second layer occurs, resulting in a predominantly horizontal alignment with pretilt angle of 0-5 degrees. FIG. 2 illustrates AFM images 201-206 of the nano-domain structures (or lack thereof) produced by concentrations of ROP-103 ranging from 0% (201) to 10% (206).

Figure 3:
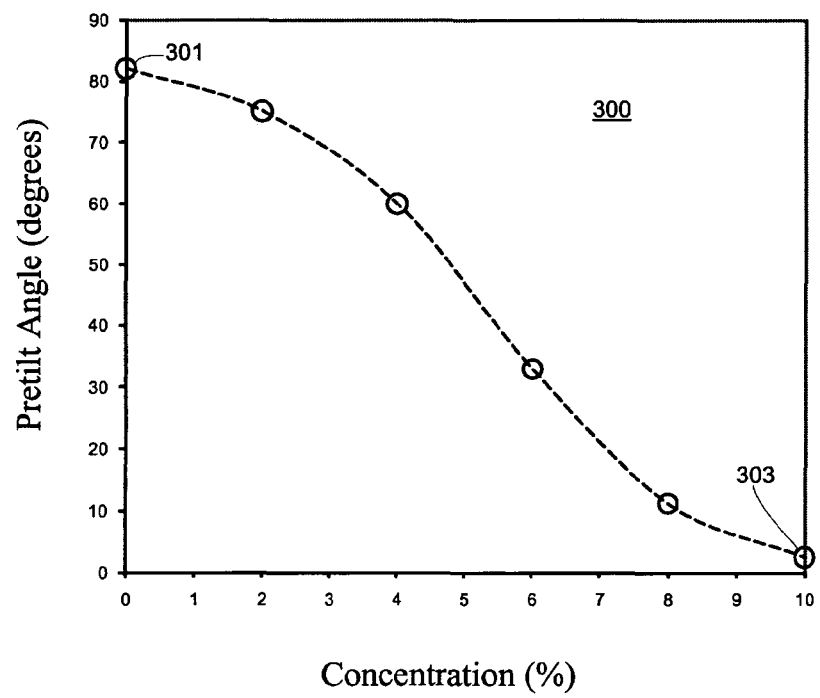
FIG. 3 is a graph of a pretilt angle of the liquid crystal as a function of concentration of a horizontal photoalignment material.

Similarly, the plot 300 of FIG. 3 shows the resulting pretilt angles produced by varying concentrations of ROP-103 used for the second layer between 0% (301) and 10% (303). The nano-domain structures allow for further variation of the pretilt angle by varying the light dosage, so only lower concentrations of ROP-103 should be used in order to facilitate the formation of those structures.

Figure 4:
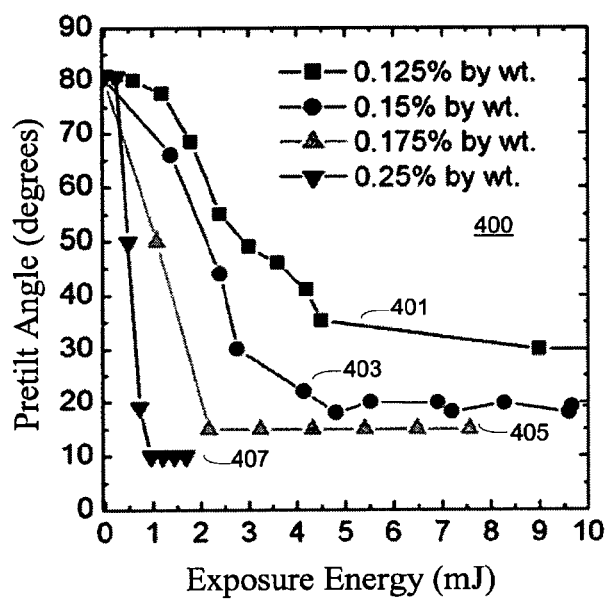
FIG. 4 is a graph of a pretilt angle of a liquid crystal as a function of light dosage for a fixed amount of second layer material.

Given a bilayer composition of nano-domain structures such as those shown in FIG. 2 (201 TO 206), the pretilt angle is a function of the alignment light dosage. The plot series 400 of FIG. 4 shows the pretilt angles obtained by using different dosages of light for different concentrations of ROP-103. In particular, plots 401, 403, 405, and 407 show the acquired pretilt angle in degrees as a function of the exposure energy for ROP-103 concentrations by weight of 0.125%, 0.15%, 0.175%, and 0.25% respectively.

As will be appreciated from FIG. 4, at higher concentrations, the pretilt angle is much more sensitive to the light dosage and changes abruptly as light dosage is increased. At lower concentrations, the pretilt angle is less sensitive to the light dosage and changes gradually as light dosage is increased. Thus, in practice, it is easier to control the pretilt angle produced with lower concentrations of ROP-103.

Given a substrate coated with polyimide and photoalignment material forming vertical and horizontal nano-domain structures as described above, a spatially variable distribution of pretilt angles can be achieved by applying a spatially variable light dosage of linearly polarized light to the photoalignment material layer. Any unexposed region of the photoalignment material layer can be washed away by a solvent. For ROP-103, ultraviolet light with a wavelength of 300 nm is used, as ROP-103 can be polymerized by light with wavelengths ranging from 280 nm to 320 nm. Light dosage can be varied by either varying the light intensity or the exposure time, and thus the spatial variation of the light dosage can be effected in many ways. For example, spatial intensity filters, light stops, or laser beams with modulated intensity filters can be used to produce spatially variable light dosage. With a spatial intensity filter, total exposure time is the same for all locations but the filter can attenuate the light intensity in a specified pattern. With a laser beam, the intensity profile of the laser beam can be modulated, or for some laser beams, the inherent Gaussian intensity profile of their fundamental mode can be used. With a light stop, a circular beam stop can be increased in size with time according to the light dosage profile as needed for a circular spatial variation, or a slit can be opened up with time for a one-dimensional spatial variation.

After photoalignment of the second alignment layer, the substrate is ready to be used in laminating the liquid crystal cell. An additional second substrate with a horizontal or vertical polyimide layer but no photoalignment layer is needed to form the liquid crystal cell. Standard fabrication techniques—spacer spray, perimeter seal formation, cell formation and liquid crystal filling—are performed to produce the completed liquid crystal cell, as will be appreciated by those of skill in the art.

In a further embodiment of the invention, a circular lens is fabricated using a particular type of spatial variation of light dosage. If the retardation is at a maximum at the center of a liquid crystal cell and decreases radially outward, the result is a refractive liquid crystal lens. The formula for such retardation is given by $$\delta(x,y) = \delta_o\left(\frac{r_o-r}{r_o}\right)^2 \text{ for } r < r_o$$

where $r$ is the radial distance and $r_o$ is the radius of the lens.

Ideally, for a lens, the change in retardation from the center (strongest light and hence horizontal alignment) to the edge (no light and hence vertical alignment) should be $$\Delta\delta = \frac{2\pi d \Delta n}{\lambda}.$$

Figure 5:
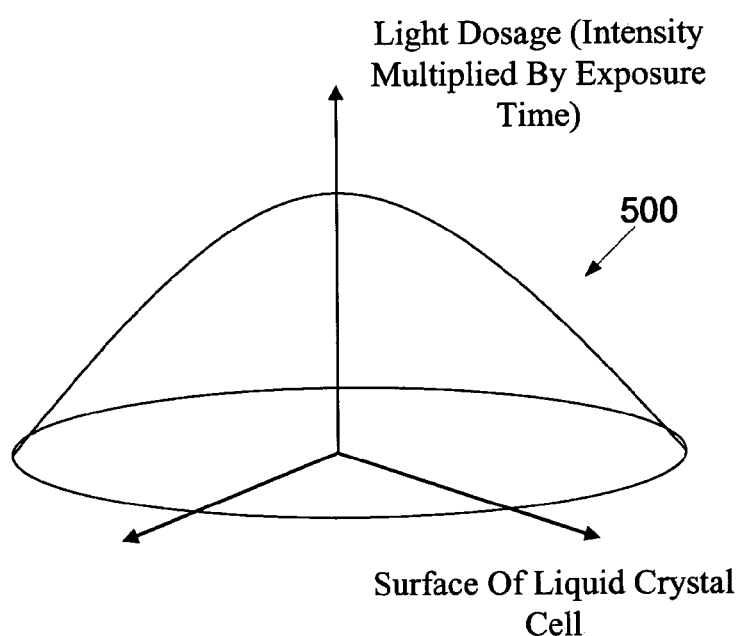
FIG. 5 is three-dimensional representation of the spatial variation of light dosage leading to a spherical lens.

From the above criteria, the spatial variation of the light dosage can be calculated. FIG. 5 illustrates the light dosage profile 500 in this case.

Experimentally, the first coating is a polyimide that can produce vertical alignment. The second coating is a photo-alignment material that can be polymerized and aligned by a linearly polarized light. The light used for aligning the second layer is intensity modulated using a variable attenuator to have a circular shape. After the photoaligment material is exposed by the modulated light, a solvent is used to remove the remains unpolymerized photoalignment materials. The substrate is ready to be used in laminating the liquid crystal cell. The other substrate is coat with a vertical polyimide layer. The cell gap is 18 microns and the birefringence of the liquid crystal molecule is 0.20.

Figure 6:
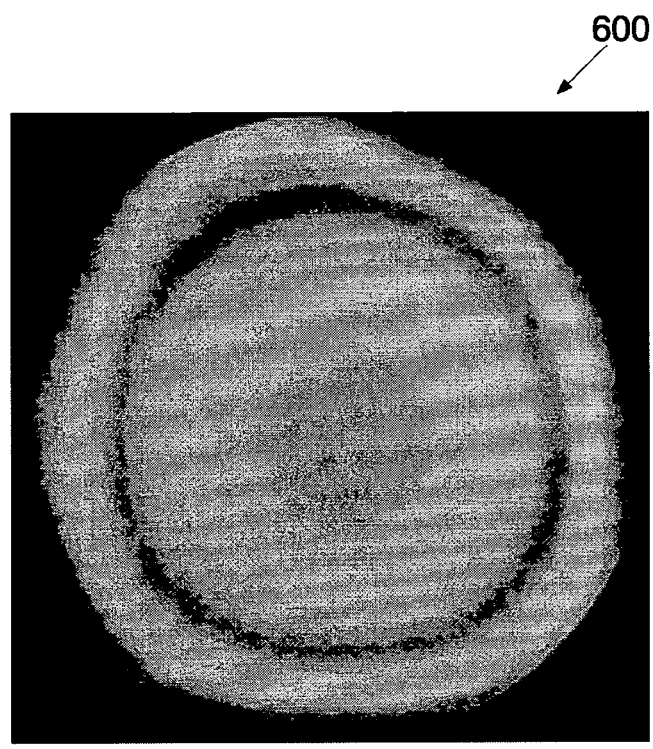
FIG. 6 is a two-dimensional plot illustrating the spatial variation of retardation as a result of a spatially varying circular light dosage pattern.

FIG. 6 shows the spatial variation 600 of pretilt angle across the liquid crystal cell when further sandwiched between two cross polarizers. The change in image density shows changes in optical retardation. From this diagram, one can see that the retardation changes by $4\pi$ over this lens.

If the radius of the lens is $r_o$, the effective focal length will be given by $$f = \frac{r_o^2}{2(n_e - 1)d\Delta n}$$

for suitably polarized light. In the present preferred embodiment, $r_o=0.5$ mm, $n_e=1.8$, $d=15$ microns, $\Delta n=0.25$, and the focal length is about 10 cm. The focal length of this lens is electronically tunable, and the focal length increases towards infinity as a voltage is applied to decrease $\Delta n$ towards zero.

Figure 7:
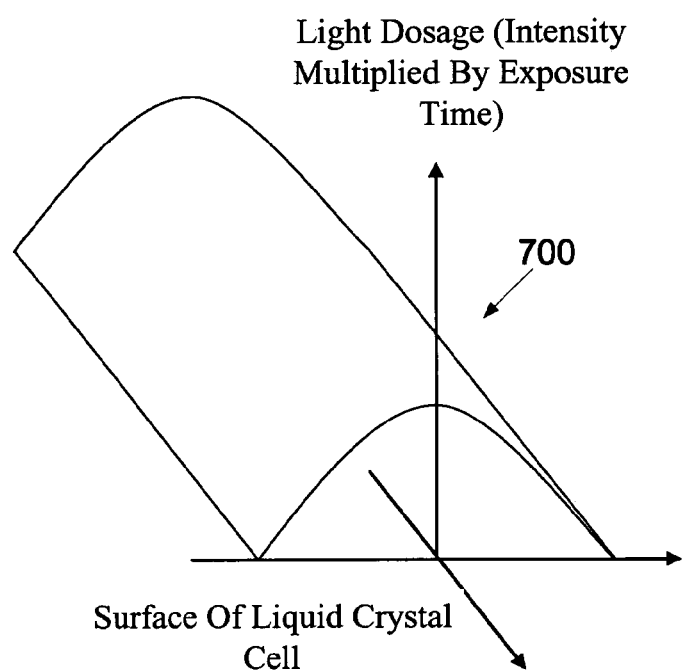
FIG. 7 is a schematic plot illustrating the spatial variation of light dosage leading to a cylindrical lens.

In yet another embodiment of the present invention, a cylindrical lens is fabricated using another type of spatial variation of light dosage as shown in the simplified plot 700 of FIG. 7. The spatial variation of retardation for a cylindrical lens is given by $$\delta(x, y) = \delta_o \left(\frac{x_o - x}{x_o}\right)^2$$

for $-x_o < x < x_o$.

Again, the maximum change in retardation for this device is $$\Delta\delta = \frac{2\pi d \Delta n}{\lambda}$$

If the radius of the lens is $r_o$, then the equivalent focal length for light in the x-direction will be given by $$f = \frac{r_o^2}{2(n_e - 1)d\Delta n}$$

For light in the y-direction, there is no focusing effect since this is a cylindrical lens.

Figure 8:
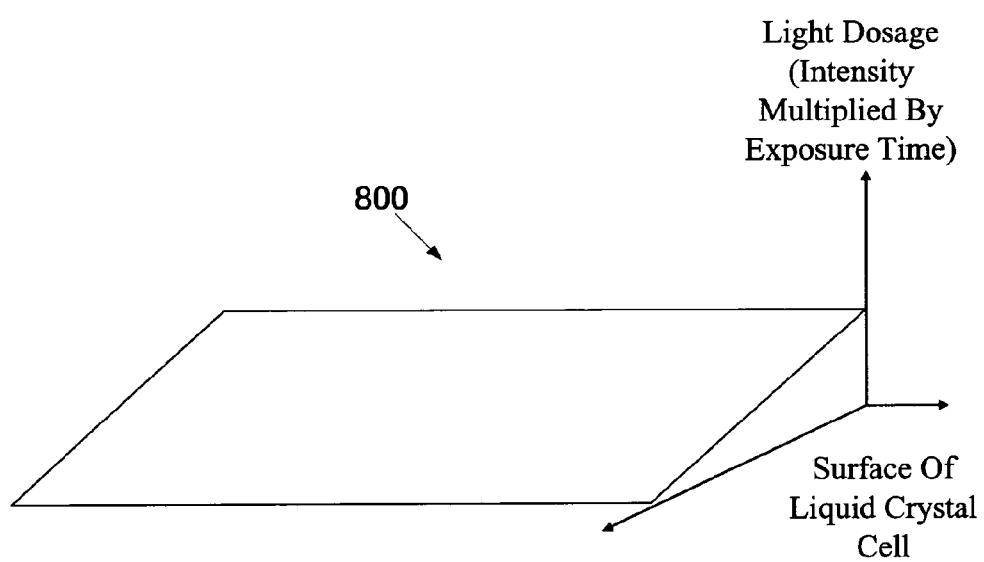
FIG. 8 is a schematic plot illustrating the spatial variation of light dosage leading to a beam-steering device behaving in the manner of a prism.

In yet another embodiment of the present invention, a beam steering device is fabricated using another type of light dosage profile as shown by the simplified plot 800 of FIG. 8. A beam steering device behaves optically as a prism, and the retardation of the cell varies linearly from one side to the other in a one dimensional manner. That is $$\delta(x,y)=\delta_o(L-x) \text{ for } L > x > 0$$

In this case the liquid crystal cell behaves optically as a prism with side L. The optical steering of a polarized incident beam perpendicular to the surface is given by $$\Delta\theta = (n_e - 1)\frac{d\Delta n}{L}$$

Thus if L=1 mm, $n_e$=1.8, d=15 micron, $\Delta n$=0.25, the beam steering angle is about 30 mrad.

Thus, it will be appreciated that a new and useful system for creating spatially varying pretilt angle across a liquid crystal cell. However, it will also be appreciated that the disclosed embodiments are merely examples, and that the described principles are more widely applicable. All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for producing a liquid crystal cell having a spatially varying pretilt angle across the liquid crystal cell, the method comprising the steps of:
   applying a first coating to a substrate, such that the first coating has a first optical alignment;
   applying a second coating of photoalignable material onto said first coating; and exposing the said second coating to electromagnetic radiation with spatially variable dosage across the surface of the second coating, so as to induce a dosage dependent optical alignment in the second coating;

wherein the spatially variable dosage across the surface of the second coating is produced by variable exposure time.

2. The method of claim 1, wherein the first coating comprises polyimide.

3. The method of claim 1, wherein the second coating is comprised of nano-domain structures.

4. The method of claim 1, wherein the electromagnetic radiation is a variable light dosage being produced by variable light intensity.

5. The method of claim 1, wherein the said first coating is a vertical alignment material.

6. The method of claim 1, wherein the said second coating is a photo-induced polymer.

7. The method of claim 1, wherein the electromagnetic radiation used for the step of exposing is linearly polarized.

8. The method of claim 1, wherein the electromagnetic radiation used for the step of exposing has a circularly symmetrical intensity pattern, which is centrally peaked and falls to zero radially, such that the liquid crystal cell so produced exhibits circular lens optical behavior with respect to incoming linearly polarized light.

9. The method of claim 1, wherein the electromagnetic radiation used for the step of exposing has a one dimensionally varying intensity pattern with a profile that is centrally peaked and falls to zero laterally such that the liquid crystal cell so produced exhibits cylindrical lens optical behavior with respect to incoming linearly polarized light.

10. The method of claim 1, wherein the electromagnetic radiation used for the step of exposing has a spatially variable intensity pattern monotonically decreasing from one side to another, such that the liquid crystal cell so produced exhibits prismatic optical behavior with respect to incoming linearly polarized light.

11. A method for producing a liquid crystal cell having a spatially varying pretilt angle across the liquid crystal cell, the method comprising the steps of:

applying a first coating to a substrate, such that the first coating has a first optical alignment;

applying a second coating of photoalignable material onto said first coating; and exposing the said second coating to electromagnetic radiation having spatial intensity profile that is maximum at the center and falls to zero radially in a circular geometry across the surface of the second coating.

12. A method for producing a liquid crystal cell having a spatially varying pretilt angle across the liquid crystal cell, the method comprising the steps of:

applying a first coating to a substrate, such that the first coating has a first optical alignment;

applying a second coating of photoalignable material onto said first coating; and exposing the said second coating to electromagnetic radiation having spatial intensity profile that is a one-dimensional spatial profile that is maximum in the center and falls to zero monotonically on both sides across the surface of the second coating.

13. A method for producing a liquid crystal cell having a spatially varying pretilt angle across the liquid crystal cell, the method comprising the steps of:

applying a first coating to a substrate, such that the first coating has a first optical alignment;

applying a second coating of photoalignable material onto said first coating; and exposing the said second coating to electromagnetic radiation having one-dimensionally varying spatial intensity profile that is maximum on one side and falls to zero monotonically to the other side across the surface of the second coating.

14. A method for producing a liquid crystal cell having a spatially varying pretilt angle across the liquid crystal cell, the method comprising the steps of:

applying a first coating to a substrate, such that the first coating has a first optical alignment;

applying a second coating of photoalignable material onto said first coating; and exposing the said second coating to electromagnetic radiation with spatially variable dosage across the surface of the second coating, so as to induce a dosage dependent optical alignment in the second coating;

wherein the electromagnetic radiation used for the step of exposing is linearly polarized.

* * * * *